United States Patent [19]

Ugon

[11] Patent Number: 4,544,833
[45] Date of Patent: Oct. 1, 1985

[54] PROCESS AND APPARATUS FOR AUTHENTICATING OR CERTIFYING AT LEAST ONE ITEM OF INFORMATION CONTAINED IN A MEMORY OF A REMOVABLE AND PORTABLE ELECTRONIC CARRIER, SUCH AS A CARD

[75] Inventor: Michel Ugon, Maurepas, France

[73] Assignee: CII Honeywell Bull (Societe Anonyme), Paris, France

[21] Appl. No.: 486,671

[22] Filed: Apr. 20, 1983

[30] Foreign Application Priority Data

May 14, 1982 [FR] France ................. 82 08405

[51] Int. Cl.$^4$ ............................... G06F 15/30
[52] U.S. Cl. .................... 235/379; 235/380; 235/492
[58] Field of Search .............. 235/379, 380, 492

[56] References Cited

U.S. PATENT DOCUMENTS 4,193,061  3/1980  Zoltai .
4,278,837  7/1981  Best .
4,453,074  6/1984  Weinstein ............... 235/380

FOREIGN PATENT DOCUMENTS 28965   5/1981  European Pat. Off. .
29894   6/1981  European Pat. Off. .
2020513 11/1979  United Kingdom .

*Primary Examiner*—David L. Trafton
*Attorney, Agent, or Firm*—Kerkam, Stowell, Kondracki & Clarke

[57] ABSTRACT

Process and device for authenticating or certifying at least one item of information contained in a memory of a portable electronic carrier, such as a credit card. To certify an item of information (I) recorded in a memory (M) of a card (C), the process consists in causing processing circuits (TC) of the card (C) to execute a program (P) which takes into account the address of the information (I) in the memory (M). The address is communicated to the card (C) externally. The execution of the program (P) leads to a result (R) which is compared with a result (R') calculated in identical fashion by a transaction apparatus (I) to which the card (C) is connected, agreement between the results establishing the authentication of the information.

33 Claims, 1 Drawing Figure

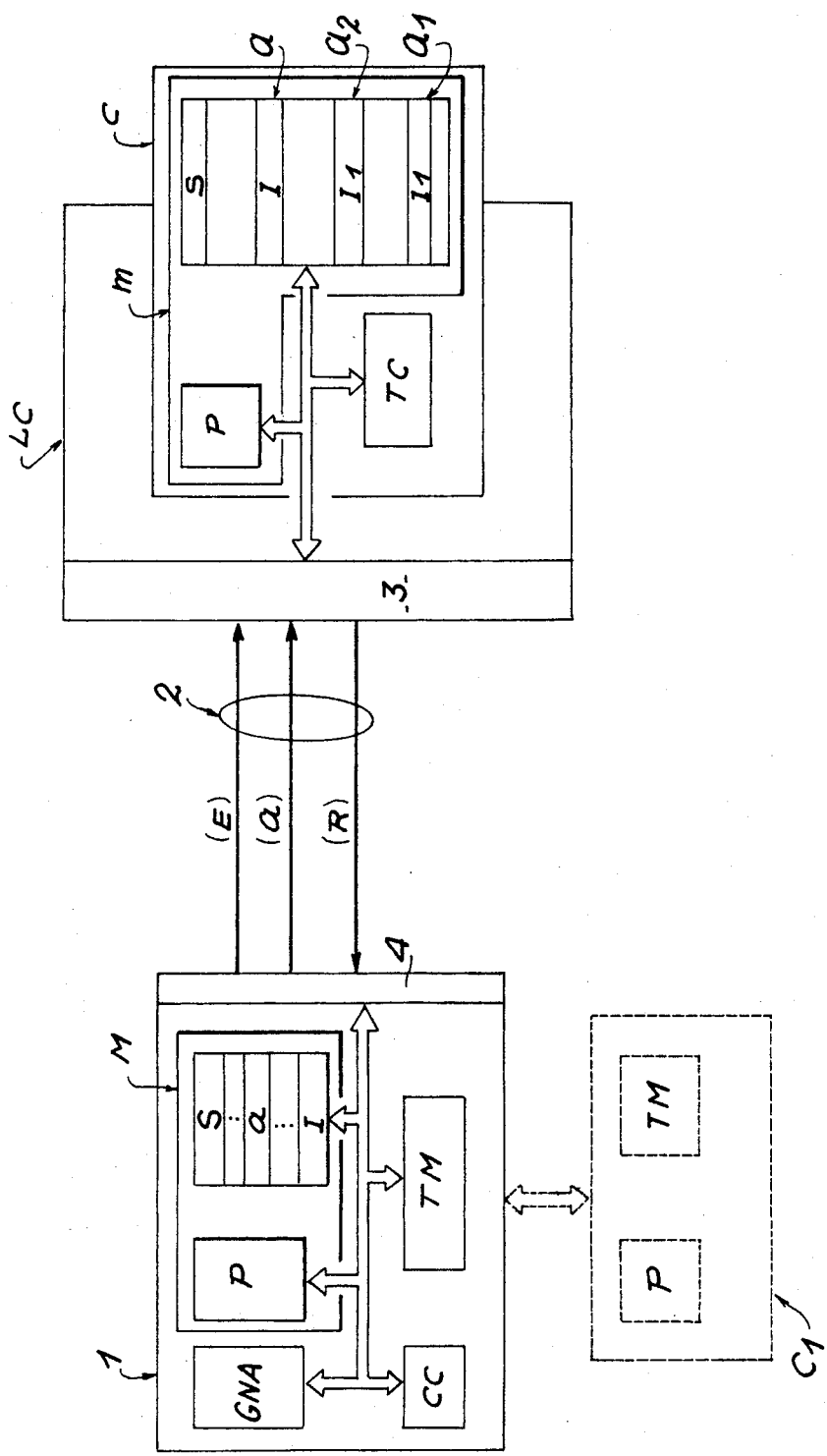

PROCESS AND APPARATUS FOR AUTHENTICATING OR CERTIFYING AT LEAST ONE ITEM OF INFORMATION CONTAINED IN A MEMORY OF A REMOVABLE AND PORTABLE ELECTRONIC CARRIER, SUCH AS A CARD

BACKGROUND OF THE INVENTION

1. Field of the Invention

The present invention relates generally to problems relative to the validity check of data recorded in a memory of a portable electronic carrier such as an identification or credit card and is particularly directed to a process and an apparatus or device for authenticating or certifying at least one item of information contained in a memory of the portable electronic carrier in order to prevent fraudulent use thereof or any possibility of an unauthorized breaking in on the dialog between a transaction apparatus and a card connected thereto by attempting to make the transaction apparatus "believe" that the dialog is being conducted completely normally.

2. Description of the Prior Art

Systems based on the use of removable electronic carriers such as an identification or credit card which enable persons or organizations to perform protective operations that are peculiar to the particular applications under consideration are known in the art.

Generally speaking, each application is tantamount to permitting the holder of a card to gain access to a protected service which necessarily calls for the reading and/or writing of information in the memory of the card to enable access to the service requested and possibly to keep track of this access represented, for example, by a debit of a sum of money written into the card from the moment when the service is payable.

Taking into account the diversifications of applications that these systems can cover (bank and billing transactions, access to networks, to data banks, to subscription services, to protected enclosures, . . .) modifications or improvements are constantly being made in these systems, if only to take into consideration the characteristics that are peculiar to each application.

From the moment when a notion of protected access or protected service occurs, one must necessarily associate with this notion the notion of fraud. Indeed, the holder of a card will not be able to refrain from asking himself the followng questions:

In the case of a subscription service, is it not possible, in certain cases, to have access to this service free of charge?

Is it not possible, with the card, to have access to services to which I normally have no access?

To palliate these attempts to fraud, a very important improvement consists in using random and short passwords to prevent unauthorized use and a deceiver from reproducing a sequence of a previous authorized conversation or dialog between the transaction apparatus and the card connected thereto as a means of gaining unauthorized access to the enclosure or service. Such an improvement has been described in French Pat. No. 2,469,760 entitled "Process And System For Identifying Persons Requesting Access To Certain Circles" and its corresponding U.S. Pat. No. 4,471,216 (Ser. No. 200,785) assigned to the assignee of the present invention. The aforenoted system is satisfactory when it involves the protection of an access to a circuit that lies outside or is external to the portable electronic carrier or card; however, because it is usually in such systems to write or read information into the memory of the card, either locally or remotely, the interface between the remote transaction apparatus and the electronic carrier is particularly vulnerable to observation and simulation by specialists. There exists in such systems a possibility of deviating the dialog to an organization having the capacity to generate a plausible sequence which would enable fraudulent use of the card. To be more precise, an experienced or skilled deceiver could, by generating a sequence of information, copied from or based on previous dialog information between the card and the transaction apparatus, create signals whose object is to make the remote apparatus "believe" that the certain operations have indeed taken place in relation to a duly enabled electronic carrier or card and the transaction apparatus to which it is connected.

SUMMARY OF THE INVENTION

The present invention eliminates or at least minimizes this disadvantage by relying on the introduction of an item of data dependent upon the word to be read and upon its position in the memory of the electronic carrier. This precaution allows one to ascertain the origin of a data item which travels along the link between the transaction apparatus and the carrier or card, that is to say, even if the apparatus is remote from the carrier, which is indispensable in domestic applications that are not subject to in-situ surveillance, such as subscription service systems for home use.

Therefore, the invention proposes a process of authenticating or certifying at least one item of information (I) contained in a memory of a portable electronic carrier or card connected to an apparatus (1) that ensures the transfer of information within the card, said card and said apparatus comprising processing circuits of the type that consists in:

causing the execution, through the processing circuits of the card and of the apparatus, of the same program (P) that performs an algorithm leading to the calculation of a result (8) within the card and of a result (R') within the apparatus;

comparing the results (R) and (R'), an agreement between said two results proving the authentication of the information (I), characterized in that it consists in causing said algorithm to take account of:

a parameter (i) representing an item of data that is correlated to the information (I) to be certified, and a parameter (a) representing the position in the memory of the information (I) to be certified.

Advantageously, the process according to the invention consists in giving to the parameter (i) the value of the information (I) to be certified, and to give to the parameter (a) the value of the storage location for the information (I) to be certified.

BRIEF DESCRIPTION OF THE DRAWING

Other features, advantages, and details of the invention will be apparent from the following description with reference to the accompanying schematic drawing given by way of example and illustrating the essential elements of a transaction apparatus and of a card connected thereto in order to show the principle and the implementation of the process according to the invention.

DESCRIPTION OF THE PREFERRED EMBODIMENTS

Now, referring to the drawing, an apparatus (1) represents a transaction apparatus, to which can be connected a removable and portable carrier, such as a card (C). The apparatus (1) and the card (C) are connected by means of a card reader LC and transmission line (2). Such a line is particularly described in French Pat. No. 2,483,713 in the name of the Applicant and entitled "Device For The Transmission of Signals Between Two Information Processing Stations" and its corresponding U.S. Pat. application Ser. No. 657,471, which is a continuation of Ser. No. 262,607, now abandoned, assigned to the assignee of the present invention.

The transaction apparatus (1) comprises at least one memory (M) and data processing circuits (TM) in order to execute a program (P) that has previously been written into the memory (M) and whose operation allows the execution of an algorithm that leads to a result (R') by means of parameters that will be hereinafter defined.

The card (C) also contains at least one memory (m) and data processing circuits (TC) for executing the same program (P) previously recorded in the memory (m) and whose operation permits the execution of the same algorithm mentioned earlier by giving a result (R) in accordance with the parameters which will be defined hereinafter.

The transaction apparatus (1) enables a certain number of individuals constituting a population to access at least one protected service. All the individuals of the defined population are holders of a card (C) for accessing this service. At the limit, a single card can be made available to this population, but obviously in any subscription service the commercial viability depends on the number of authorized users, i.e. the number of cards issued.

In general, and more particularly in the example which will now be described, access to this service will result in reading and writing operations in the card (C) and in computing operations by the processing circuits (TM; TC) of the apparatus (1) and of the card (C) in conformity with the process embodying the invention.

Assume an individual who desires to benefit from a service through his card (C). This card (C) is coupled locally or remotely to the transaction apparatus (1) which will validate and materialize the service rendered to this individual. For example, the card (C) is introduced into card reader (LC) which is connected to the transaction apparatus (1) by means of the transmission line (2) and two interfaces (3, 4) provided, respectively, within the reader (LC) and the apparatus (1).

After initialization of the system and the reader (LC) has, for example, verified that the card is indeed held by an authorized individual, a dialog will occur between the apparatus (1) and the card (C). In the course of this dialog, the transaction apparatus (1) will authenticate or certify whether or not an item of information (I) is contained in the memory (m) of the card (C). Put differently, the transaction apparatus (1) will ascertain that an item of information (I) communicated by the card (C) is indeed that which is contained at a given address in the memory (m), or that an item of information (I) that has previously been written in the memory (M) has indeed been written at the address specified. Thus, the item of information (I) recorded at the address (a) of the memory (m) of the card (C) will be certified or authenticated against the content of the memory (M) of the transaction apparatus 1.

Such a certification is effected by the successive execution of the following operations:

(1) a generator of random numbers (GNA) in the transaction apparatus (1) provides a random number (E) which is transmitted to the card (C);

(2) the transaction apparatus (1) also sends to the card (C) the address (a) of the information (I) to be certified, said address (a) and the information (I) contianed at this address (a) in the memory (m) of the card being, needless to say, known by the transaction apparatus and recorded in its memory (M);

(3) the card (C) then executes the program (P) by means of its processing circuits (TC) in order to execute an algorithm which leads to the calculation of the result (R) by means of the following parameters: (E), (a), (I) and (S), where (E) is the random number mentioned earlier, (a) an address of the memory (m); (I) the information contained at said address (a); (S) is a specific secret code of the service requested and written both within the card (C) and within the transaction apparatus (1), said secrete code being unknown to the card holder and inaccessible from the outside as well as the program (P);

(4) the transaction apparatus (1) also executes the program (P) by means of its processing circuits (TM) in order to execute the same algorithm which leads to the computation of a result (R') through the parameters (E), (a), (I) and (S) mentioned above;

(5) the card (C) transmits its result (R) to the transaction apparatus (1) which, by means of a comparator circuit (CC), compares it with the result (R').

If there is agreement between the two results (R) and (R'), the information (I) has been certified by the apparatus (1), that is to say, that this information (I) is not only accurate in its content, but has also indeed been written into the storage memory (m) location (a) of the card (C).

An example of the invention will be given hereinbelow:

Suppose that an individual carrying a card (C) demands access to a protected subscription service. The request for access which will be translated by the card (C) is recorded into the memory (m). In order to keep track of the cost of access or charges for this service, information or data coresponding to his cost or charges must be recorded.

The transaction apparatus (1) writes into the card (C) this sum of money or charges corresponding to the information (I). Now, let us assume that this operation of writing the information (I) into the location address (a) of the memory (m) of the card (C) is completed, and that this address (a) is, for example, the first free storage location.

It is important, even indispensable, that the transaction apparatus (1) verify that the information (I) has indeed been written into the address (a) of the memory (m) of the card (C). This is tantamount to certifying the information (I) by performing the sequence of certification operations described previously and resulting in the comparison of the two results (R) and (R') mentioned earlier.

Such a procedure allows one to prevent an attempt at fraud by the individual carrying the card (C). As a matter of fact, this individual, called deceiver, may be tempted to make believe that the information (I) has indeed been recorded in the address (a), while in reality he has succeeded in causing it to be written into another address outside the card (C). Without involving the addresses in the authentication or certification of the information (I), such an operation is very well possibly by a specialist. On the other hand, by involving the address (a) of the information (I), the fraud is no longer possible for the following reasons:

This address (a), the random number (E) and the result (R) are the only data that can be accessed by the deceiver, that is to say, the data flowing along the transmission line (2). However, it is important to note that the deceiver does not know the mode of calculating the result (R), because the latter is performed within the card (C) by the program (P) which cannot be accessed from the outside and is therefore secret.

If the deceiver modifies the address (a), the result (R) calculated within the card (C) will necessarily be different from the result (R') calculated by the transaction apparatus (1) which takes account of the address (a) and not the modified address. Hence, even if the deceiver has been able to write, by any means, the information (I) into an address other than the address (a), the transaction apparatus (1) will be able to detect such a fraud, that is to say, it will be able to ascertain that the information (I) has not been written into the address (a).

Under these conditions, it is possible that the deceiver will be tempted to communicate himself the result (R) normally calculated within the card (C) by taking account of the address (a), known that the card (C) will calculate a result (R) which will take account of the modified address which is necessarily communicated by the deceiver to the card (C) so that the latter can write the information (I) into this modified address. To do this, it would be necessary for the deceiver to calculate or to known in advance the result (R) corresponding to the address (a), but that is impossible because he does not know the mode of calculating this result such as defined by the program (P) written into the memory (m) of the card (C) and inaccessible from the outside.

A special case is interesting to describe, when the transaction apparatus (1) wants to write an item of information ($I_1$) into an address ($a_1$) and the deceiver knows in advance that an identical item of information has already been written into the address ($a_2$). In this case, the deceiver will be tempted to cause the information ($I_1$) to be written again into an address ($a_2$), especially if this information represents a bank debit. Such a fraud is also possible by the mere fact that the two items of information ($I_1$) are distinguished by their respective addresses ($a_1$) and ($a_2$).

Some precautionary steps must also be taken within the transaction apparatus (1) whose memory (M) contains the program (P). To the extent that this apparatus is located in a protected enclosure, it is not necessary to take precautionary measures in advance.

However, in certain cases, it will be preferable to record the program (P) in an electronic carrier ($C_1$) which, for instance, may be of the same nature as the card (C). In these conditions, it will be necessary to validate the execution of the program (P) within the transaction apparatus (1) so as to supply a secret code known by the operator of the transaction apparatus and tested by the card coupled to the transaction apparatus (1). This type of card is particularly described in French Pat. No. 2,401,459 and in the French application patent No. 78 12 119, corresponding to, respectively, U.S. Pat. No. 4,211,919 and U.S. application Ser. No. 207,463, now U.S. Pat. No. 4,382,279.

If the program (P) is recorded in a card ($C_1$) within or associated with the transaction apparatus (1), the execution of this program would require the introduction into the card ($C_1$) of the information (I) to be certified, and it would be necessary to write the information (I) into the card ($C_1$) at an address (a) which is the same as that of the memory (m) of the card (C). In these conditions, it is simpler to consider the information (I) to be certified within the card ($C_1$) as an external item of information that has been entered into the card ($C_1$) by the operator.

CROSS REFERENCE TO RELATED APPLICATIONS

The subject matter of this application is related to U.S. application for patent, Ser. No. 200,785, now U.S. Pat. No. 4,471,216; U.S. application for patent, Ser. No. 657,471, which is a continuation of Ser. No. 262,607, now abandoned; U.S. Pat. No. 4,211,919 and (CiiHB Case 2235) U.S. application for patent No. 207,463, now U.S. Pat. No. 4,382,279, and the subject matter of said patents and applications are hereby incorporated by reference.

I claim:

1. A process of authenticating or certifying at least one item of information (I) contained in a memory of a portable electronic card adapted to be connected to an apparatus (1) that ensures the transfer of information with the card (C), comprising:
   (a) causing the execution in card (C) and in the apparatus (1) of an identical program (P) that performs an algorithm leading to the calculation of a result (R) within the card and of a result (R') within the apparatus;
   (b) comparing the results (R) and (R'), an agreement between these two results proving the authentication of the information (I),
   (c) causing said algorithm to take account during the execution of said program a parameter
      (i) representing an item of data which is correlated to the information (I) to be certified, and
      (ii) a parameter (a) representing the position in the memory of the information (I) to be certified.

2. The process as defined in claim 1 consisting in conferring upon the parameter (i) the value of the information (I) to be certified.

3. The process as defined in claim 1 consisting in conferring upon the parameter (a) the value of the storage location for the information (I) to be certified.

4. The process as defined in claim 2 consisting in conferring upon the parameter (a) the value of the storage location for the information (I) to be certified.

5. The process as defined in claim 1 and further including the step of causing said algorithm to take account of a random number (E) supplied by the card (C) or by the apparatus (1).

6. The process as defined in claim 2 and further including the step of causing said algorithm to take account of a random number (E) supplied by the card (C) or by the apparatus (1).

7. The process as defined in claim 3 and further including the step of causing said algorithm to take account of a random number (E) supplied by the card (C) or by the apparatus (1).

8. The process as defined in claim 4 and further including the step of causing said algorithm to take account of a random number (E) supplied by the card (C) or by the apparatus (1).

9. The process as defined in claim 1 further including the step of causing said algorithm to take account of a secret code (S) that has been prerecorded in the card (C) and in the apparatus (1).

10. The process as defined in claim 2 further including the step of causing said algorithm to take account of a secret code (S) that has been prerecorded in the card (C) and in the apparatus (1).

11. The process as defined in claim 3 further including the step of causing said algorithm to take account of a secret code (S) that has been prerecorded in the card (C) and in the apparatus (1).

12. The process as defined in claim 4 further including the step of causing said algorithm to take account of a secret code (S) that has been prerecorded in the card (C) and in the apparatus (1).

13. The process as defined in claim 5 further including the step of causing said algorithm to take account of a secret code (S) that has been prerecorded in the card (C) and in the apparatus (1).

14. The process as defined in claim 6 further including the step of causing said algorithm to take account of a secret code (S) that has been prerecorded in the card (C) and in the apparatus (1).

15. The process as defined in claim 7 further including the step of causing said algorithm to take account of a secret code (S) that has been prerecorded in the card (C) and in the apparatus (1).

16. The process as defined in claim 8 further including the step of causing said algorithm to take account of a secret code (S) that has been prerecorded in the card (C) and in the apparatus (1).

17. The process as defined in claim 1 including the step of prerecording said program (P and a secret code (S) in the card (C) and in the apparatus (1), said program (P) and said secret code (S) being inaccessible externally of the card and the apparatus.

18. The process as defined in claim 17 including coupling to the apparatus (1) a portable carrier, such as a card (C₁), in which is recorded the program (P) and circuits for execution of the program within the card.

19. The process as defined in claim 18 further including the step of externally entering into the card C₁ the information (I) to be certified.

20. A portable electronic card for certifying at least one item of information transferred to the card from a transaction apparatus comprising at least one memory (m) within the card, said memory containing at least one item of information (I) to be certified, means (TC) within the card for execution of a program (P), said program being stored in the memory (m) and upon execution gives a result (R) taking account at least the information (I) and an address (a) of said information (I) in the memory (m), and means for communicating said address (a) to the means for execution (TC) externally of the card.

21. The card as defined in claim 20 wherein the memory (m) contains a secret code (S), said code (S) being taken into account by the program (P) during execution thereof.

22. The card as defined in claim 20 wherein the program (P) takes into account a random number (E) transmitted to the means.

23. The card as defined in claim 21 wherein the program (P) takes into account a random number (E) transmitted to the means.

24. A transaction apparatus adapted to be coupled with a portable electronic card (C) for certifying at least one item of information on the card (C) comprising a memory (M), means (TM) for processing a program (P) and a comparator circuit (CC), said program (P) being contained in the memory (M) and whose execution by the means (TM) takes into account of at least information (I) to be certified and an address (a) in said information (I) being stored at a memory (m) of the card (C) so as to yield a result (R'), said comparator circuit (CC) comparing the result (R') with a result (R) calculated within the card whereby agreement between said results (R and R') establish the authentication of the information (I).

25. The apparatus as defined in claim 24 wherein the program (P) includes a code (S) secret to the user and recorded in its memory (M), said secret code (S) being identical to a secret code (S) included in an identical program (P) within the card (C).

26. Apparatus as defined in claim 24 wherein the program (P) operates on a random number (E) supplied by a generator of random numbers (GNA) within the apparatus and means for transmitting said random number to the card (C).

27. Apparatus as defined in claim 25 wherein the program (P) operates on a random number (E) supplied by a generator of random numbers (GNA) within the apparatus and means for transmitting said random number to the card (C).

28. Apparatus as defined in claim 24 wherein memory (M), program (P) and the processing circuits (TM) are included in a second card (C₁) coupled to said apparatus.

29. Apparatus as defined in claim 25 wherein memory (M), program (P) and the processing circuits (TM) are included in a second card (C₁) coupled to said apparatus.

30. Apparatus as defined in claim 26 wherein memory (M), program (P) and the processing circuits (TM) are included in a second card (C₁) coupled to said apparatus.

31. A system for authenticating at least one item of information recorded in a portable electronic card from a transaction terminal, said card includng at least one first memory (M) within said card for storing at least one item of information (I) to be authenticated at an address (A), a program (P) stored within the first memory (M) and first means within the card for execution of said program to provide a first result (R) taking into account at least the information (I) and the address of the information (I) in the first memory (m), said transaction terminal including a second memory (M), a comparator circuit and second means for execution of the program (P), said program (P) being stored in the second memory (M), execution of said program (P) at said transaction terminal taking into account at least the information (I) to be certified, the address (a) of the information (I) in the memory (m) to provide a second result (R'), means coupling said card to said transaction terminal to enable execution of said program (P) by said first and second means and to effect a comparison of the first and second results (R and R') to establish authentication of the information (I) recorded in the card at address (a).

32. The system as set forth in claim 31 wherein the first memory (M) and second memory (M) each contain a code (S), said code (S) being taken into account by the program (P) during execution thereof.

33. The system as set forth in claim 32 wherein said terminal includes means for generating a random number (E) transmitted to said card via means for coupling and to be taken into account by the program (P).

* * * * *